US012381051B2

(12) United States Patent
Aihara et al.

(10) Patent No.: US 12,381,051 B2
(45) Date of Patent: Aug. 5, 2025

(54) VACUUM CIRCUIT BREAKER

(71) Applicant: Mitsubishi Electric Corporation, Tokyo (JP)

(72) Inventors: Naoya Aihara, Tokyo (JP); Yasunori Nakamura, Tokyo (JP); Taiki Donen, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 244 days.

(21) Appl. No.: 18/266,843

(22) PCT Filed: Dec. 21, 2021

(86) PCT No.: PCT/JP2021/047189

§ 371 (c)(1),
(2) Date: Jun. 13, 2023

(87) PCT Pub. No.: WO2022/138607

PCT Pub. Date: Jun. 30, 2022

(65) Prior Publication Data

US 2024/0096573 A1 Mar. 21, 2024

(30) Foreign Application Priority Data

Dec. 23, 2020 (JP) ................................ 2020-213907

(51) Int. Cl.
*H01H 33/662* (2006.01)
*H01H 33/666* (2006.01)

(52) U.S. Cl.
CPC .... *H01H 33/66207* (2013.01); *H01H 33/666* (2013.01)

(58) Field of Classification Search
CPC ........... H01H 33/66207; H01H 33/666; H01H 33/662; H01H 33/55; H01H 33/56;
(Continued)

(56) References Cited

U.S. PATENT DOCUMENTS 8,110,770 B2 * 2/2012 Ichikawa ............. H01H 33/666 218/140
8,895,884 B2 * 11/2014 Yamamoto ........... H01H 33/666 218/7

(Continued)

FOREIGN PATENT DOCUMENTS

JP S61-153002 A 7/1986
JP H07-245046 A 9/1995

(Continued)

OTHER PUBLICATIONS

Extended European Search Report issued May 6, 2024 in European Patent Application No. 21910750.5, 8 pages.

(Continued)

*Primary Examiner* — William A Bolton
(74) *Attorney, Agent, or Firm* — XSENSUS LLP

(57) ABSTRACT

A vacuum circuit breaker comprises: a grounded tank; a vacuum chamber disposed in the grounded tank; an insulating tube disposed between one side end surface inside the grounded tank and one side end surface outside the vacuum chamber; a fixed rod inserted in the vacuum chamber; a fixed-side electrode disposed in the vacuum chamber at one end of the fixed rod; a movable-side electrode disposed in the vacuum chamber so as to face the fixed-side electrode; a movable rod partially disposed in the insulating tube and having one end with the movable-side electrode disposed thereon; a sliding member disposed on the movable rod so as to slide in the insulating tube; and a contact pressure spring disposed at the movable rod between one side end surface inside the grounded tank and the sliding member.

12 Claims, 7 Drawing Sheets

(58) Field of Classification Search
CPC ............... H01H 33/121; H01H 33/122; H01H 2033/66223; H01H 2033/66246; H01H 33/66
USPC ................................ 218/139, 118, 134, 138
See application file for complete search history.

(56) References Cited

U.S. PATENT DOCUMENTS

| | | | | |
|---|---|---|---|---|
| 8,963,037 | B2 * | 2/2015 | Nakada | H02B 13/0354 218/120 |
| 9,136,674 | B2 * | 9/2015 | Ohtsuka | H02B 13/0354 |
| 9,431,800 | B2 * | 8/2016 | Yoshida | H02B 13/045 |
| 9,893,515 | B2 * | 2/2018 | Arioka | H01H 33/161 |
| 9,912,141 | B2 * | 3/2018 | Gentsch | H01H 33/66 |
| 2014/0374383 | A1 * | 12/2014 | Shioiri | H01H 33/66207 218/139 |
| 2015/0206683 | A1 | 7/2015 | Ohda et al. | |
| 2015/0244158 | A1 * | 8/2015 | Fukuoka | H01B 17/26 218/139 |
| 2018/0025870 | A1 * | 1/2018 | Miyatake | H01H 33/66207 218/134 |
| 2018/0247780 | A1 | 8/2018 | Nagatake et al. | |
| 2022/0375705 | A1 | 11/2022 | Sugino et al. | |

FOREIGN PATENT DOCUMENTS

| | | | |
|---|---|---|---|
| JP | 2013-058312 | A | 3/2013 |
| JP | 2013-229108 | A | 11/2013 |
| JP | 6752395 | B1 | 9/2020 |
| WO | 2017/038538 | A1 | 3/2017 |

OTHER PUBLICATIONS

International Search Report and Written Opinion mailed on Mar. 8, 2022, received for PCT Application PCT/JP2021/047189, filed on Dec. 21, 2021, 9 pages including English Translation.

* cited by examiner (a)

(b)

VACUUM CIRCUIT BREAKER

CROSS-REFERENCE TO RELATED APPLICATIONS

The present application is based on PCT filing PCT/JP2021/047189, filed Dec. 21, 2021, which claims priority to JP 2020-213907, filed Dec. 23, 2020, the entire contents of each are incorporated herein by reference.

TECHNICAL FIELD

The present disclosure relates to a vacuum circuit breaker that opens or closes a movable-side electrode with respect to a fixed-side electrode disposed in a vacuum chamber.

BACKGROUND ART

While a vacuum circuit breaker normally closes a movable-side electrode with respect to a fixed-side electrode, the vacuum circuit breaker opens the movable-side electrode with respect to the fixed-side electrode to interrupt a current in an electric circuit when an accident such as a leakage of a current or a short circuit occurs in a power transmission system. A vacuum circuit breaker is mainly composed of a grounded tank, a vacuum chamber disposed in the grounded tank, an operating unit, etc. A fixed-side electrode and a movable-side electrode are disposed in the vacuum chamber, the movable-side electrode is disposed at one end of a movable rod, and the operating unit is disposed at the other end of the movable rod. Further, a contact pressure spring is disposed at the movable rod. When the movable-side electrode is closed, the contact pressure spring can apply contact pressure to the movable-side electrode to reduce contact resistance with the fixed-side electrode to ensure that the movable-side electrode is closed with respect to the fixed-side electrode. However, when the movable-side electrode is opened, the movable rod, the movable-side electrode, etc. are vibrated by minute vibration of the contact pressure spring, and a load would be imposed on them.

PTL 1 discloses an operating mechanism for a vacuum circuit breaker to suppress minute vibration of a contact pressure spring by providing an oil damper outside a grounded tank. The operating mechanism for the vacuum circuit breaker suppresses minute vibration of the contact pressure spring by the oil damper when the movable-side electrode is closed. The oil damper suppresses minute vibration of the contact pressure spring not only when the electrode is closed but also when it is opened.

CITATION LIST

Patent Literature

[PTL 1] Japanese Patent Laying-Open No, 7-245046

SUMMARY OF INVENTION

Technical Problem

When an oil damper is provided outside a grounded tank, there is a problem, that is, a vacuum circuit breaker is generally increased in size. While the oil damper may be disposed in the grounded tank, there is a problem in that it is difficult to perform maintenance for the oil dumper when the oil damper is disposed in the grounded tank as the oil damper requires periodic maintenance.

The present disclosure has been made to address the above issue, and an object of the present disclosure is to provide a vacuum circuit breaker to suppress minute vibration of a contact pressure spring when a movable-side electrode is opened without generally increasing the vacuum circuit breaker in size.

Solution to Problem

A vacuum circuit breaker according to the present disclosure comprises: a grounded tank; a vacuum chamber disposed in the grounded tank; an insulating tube disposed between one side end surface inside the grounded tank and one side end surface outside the vacuum chamber; a fixed rod inserted in the vacuum chamber; a fixed-side electrode disposed in the vacuum chamber at one end of the fixed rod; a movable-side electrode disposed in the vacuum chamber so as to face the fixed-side electrode; a movable rod partially disposed in the insulating tube and having one end with the movable-side electrode disposed thereon; an operating unit disposed at another end of the movable rod to operate the movable rod so that the movable-side electrode opens or closes with respect to the fixed-side electrode; a sliding member disposed on the movable rod so as to slide in the insulating tube; and a contact pressure spring disposed at the movable rod between the operating unit and the sliding member.

Advantageous Effects of Invention

According to the present disclosure, a vacuum circuit breaker comprises an insulating tube disposed in a grounded tank and a sliding member sliding in the insulating tube, and can thus suppress minute vibration of a contact pressure spring when a movable-side electrode is opened while the vacuum circuit breaker is not generally increased in size.

DESCRIPTION OF EMBODIMENTS

Hereinafter, a vacuum circuit breaker 100 according to an embodiment of the present disclosure will be described with reference to drawings. To facilitate illustration, coordinate axes of an XYZ orthogonal coordinate system are indicated in each figure. An X-axis direction is in a plane parallel to a surface of a floor on which vacuum circuit breaker 100 is disposed, and a movable-side electrode 6 is opened or closed in this direction. The electrode is opened in a +X direction and closed in a −X direction. A Y-axis direction is in the plane parallel to the surface of the floor on Which vacuum circuit breaker 100 is disposed, and the direction is perpendicular to the X-axis direction. A front side in the figure corresponds to a +Y direction, and a deeper side in the figure corresponds to a −Y direction. A Z-axis direction is a direction perpendicular to the surface of the floor on which vacuum circuit breaker 100 is disposed. An upper side in the figure corresponds to a +Z direction, and a lower side in the figure corresponds to a −Z direction.

First Embodiment

Figure 1:
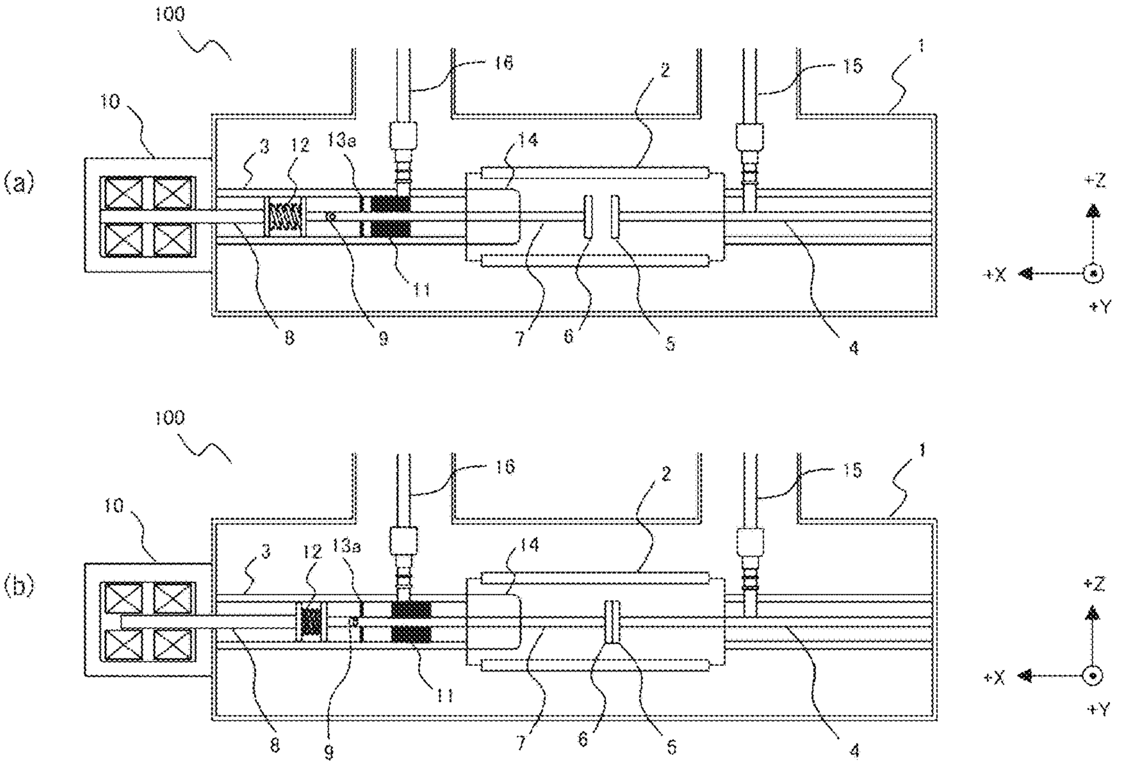
FIG. 1 is an example of a cross section of a vacuum circuit breaker according to first to third embodiments.

FIG. 1 is an example of a cross section of vacuum circuit breaker 100 according to a first embodiment. FIG. 1(*a*) is a cross section of vacuum circuit breaker 100 when movable-side electrode 6 is opened. FIG. 1(*h*) is a cross section of vacuum circuit breaker 100 when movable-side electrode 6 is closed.

As shown in FIG. 1, vacuum circuit breaker 100 comprises a grounded tank 1, a vacuum chamber 2, an insulating tube 3, a fixed rod 4, a fixed-side electrode 5, movable-side electrode 6, a movable-side conducting rod 7, a movable-side insulating rod 8, a coupling unit 9, an operating unit 10, a sliding member 11, a contact pressure spring 12, a first partition wall 13*a*, a bellows 14, a fixed-side conductor 15, and a movable-side conductor 16.

Grounded tank 1 is a grounded, metallic sealed tank and filled with an insulating gas. The insulating gas is, for example, dry air or sulfur hexafluoride. Filling grounded tank 1 with the insulating gas suppresses generation of an arc between a metal portion of a side surface of grounded tank 1 and a side surface of vacuum chamber 2.

Vacuum chamber 2 is a chamber composed of a ceramic or similarly insulating member and disposed in grounded tank 1. A vacuum equal to or lower than a predetermined pressure is set in vacuum chamber 2 to obtain high insulation performance. When movable-side electrode 6 is opened with respect to fixed-side electrode 5, an arc is generated and continues, and vacuuming vacuum chamber 2 effectively extinguishes the arc.

Insulating tube 3 is disposed between one side end surface inside grounded tank 1 and one side end surface outside vacuum chamber 2. In the ease of FIG. 1, the end surface is parallel to the YZ plane. The end surface may not necessarily be parallel to the YZ plane, and may be inclined. Insulating tube 3 is disposed to have a longitudinal direction in the X-axis direction. Insulating tube 3 is internally filled with a gas in advance so that pressure resistance is generated when sliding member 11, which will be described later, moves in the +X direction. The gas may be dry air or an insulating gas such as sulfur hexafluoride. Insulating tube 3 may or may not be connected to one side end surface inside grounded tank 1, Similarly, insulating tube 3 may or may not be connected to one side end surface outside vacuum chamber 2, However, even when not connected, it is desirable that the distance between insulating tube 3 and the one side end surface be as small as the gas in insulating tube 3 hardly leaks outside. In the case of FIG. 1, insulating tube 3 is connected to both one side end surface inside grounded tank 1 and one side end surface outside vacuum chamber 2. Vacuum chamber 2 is supported by insulating tube 3 and an insulating tube that covers a portion of fixed rod 4. Alternatively, vacuum chamber 2 may be supported by a support member (not shown) provided in grounded tank 1. For example, the support member is connected to both an inner side surface of grounded tank 1 and vacuum chamber 2.

Fixed rod 4 is inserted into vacuum chamber 2. Specifically, a portion of fixed rod 4 including at least one end thereof is inserted into vacuum chamber 2, and the other end of fixed rod 4 is fixed in grounded tank 1.

Fixed-side electrode 5 is disposed in vacuum chamber 2 at one end of fixed rod 4. Fixed-side electrode 5 is fixed in grounded tank 1 together with fixed rod 4 by being disposed on the fixed rod.

Movable-side electrode 6 is disposed in vacuum chamber 2 so as to face fixed-side electrode 5.

Movable-side conducting rod 7 has a portion in insulating tube 3 and has an opposite portion in vacuum chamber 2. Movable-side electrode 6 is disposed in vacuum chamber 2 at one end of movable-side conducting rod 7.

Movable-side insulating rod 8 has one end coupled to movable-side conducting rod 7 via coupling unit 9, and has the other end disposed in operating unit 10 via contact pressure spring 12. Movable-side insulating rod 8 serves to prevent failure of operating unit 10 by avoiding conduction to operating unit 10 from movable-side conducting rod 7, While in the case of FIG. 1, movable-side insulating rod 8, coupling unit 9, and movable-side conducting rod 7 are disposed in this order in the −X direction more negative than contact pressure spring 12, this is not exclusive. For example, with contact pressure spring 12 as a boundary, only movable-side insulating rod 8 may be disposed in the +X direction and only movable-side conducting rod 7 may be disposed in the −X direction. In this case, coupling unit 9 is dispensed with. Hereinafter, movable-side conducting rod 7, movable-side insulating rod 8, and coupling unit 9 will be collectively referred to as a "movable rod." That is, the movable rod is partially located in insulating tube 3, and has one end provided with movable-side electrode 6 and has the other end located in operating unit 10.

Operating unit 10 is disposed at the other end of the movable rod and operates the movable rod so that movable-side electrode 6 is opened or closed with respect to fixed-side electrode 5. That is, operating unit 10 operates the movable rod in the X-axis direction.

Sliding member 11 is provided at movable-side conducting rod 7 that is a component of the movable rod such that sliding member 11 slides in insulating tube 3. Sliding member 11 is moved by operating unit 10 in the X-axis direction together with the movable rod. Sliding member 11 is a lightweight metal such as aluminum. A small gap may be provided between sliding member 11 and insulating tube 3 so that an electrode opening speed is not reduced by friction with insulating tube 3.

Contact pressure spring 12 is provided at the movable rod between operating unit 10 and sliding member 11. When closing movable-side electrode 6, contact pressure spring 12 applies contact pressure to movable-side electrode 6 and thus reduces contact resistance with fixed-side electrode 5 to ensure an effect, that is, that movable-side electrode 6 is closed with respect to fixed-side electrode 5.

First partition wall 13*a* is disposed in insulating tube 3 between one side end surface inside grounded tank 1 and sliding member 11. In FIG. 1, first partition wall 13*a* is disposed between contact pressure spring 12 and sliding member 11. First partition wall 13*a* is fixed in insulating tube 3.

A bellows 14 is disposed in vacuum chamber 2. Bellows 14 serves to maintain a vacuum in vacuum chamber 2 even when the movable rod is moved by operating unit 10.

Fixed-side conductor 15 has one end connected to fixed rod 4 and has the other end connected to an external main circuit (not shown).

Movable-side conductor 16 has one end connected to the movable rod via a casting (not shown), a conductive member 18, and sliding member 11, and has the other end connected to the external main circuit (not shown), Conductive member 18 will be described later with reference to FIG. 2. In FIG. 1(*b*), when movable-side electrode 6 is closed, a current flows through a path of movable-side conductor 16, the casting, conductive member 18, sliding member 11, the movable rod, movable-side electrode 6, fixed-side electrode 5, fixed rod 4, and fixed-side conductor 15.

While in FIG. 1, contact pressure spring 12 is provided at the movable rod between operating unit 10 and first partition wall 13*a*, this is not exclusive. For example, contact pressure spring 12 may be disposed at the movable rod between sliding member 11 and first partition wall 13*a*. This can miniaturize the apparatus.

An operation of each component when movable-side electrode 6 is opened and closed will be described below with reference to FIG. 1.

As shown in FIG. 1(*a*), when movable-side electrode 6 is opened by operating unit 10, movable-side electrode 6, the movable rod, sliding member 11, and contact pressure spring 12 move in the +X direction. When the movable rod is moved in the +X direction by operating unit 10, contact pressure spring 12 has a left end moved in the +X direction, and contact pressure spring 12 is thus pulled. Thereby, a restoring force of contact pressure spring 12 acts in the +X direction, and a force in a direction in which contact pressure spring 12 is compressed is applied to a right end of contact pressure spring 12. This vibrates contact pressure spring 12 minutely and hence vibrates the movable rod. When opening the electrode, sliding member 11 moves in the +X direction, which compresses a gas between sliding member 11 and first partition wall 13*a* and thus causes variation in pressure, and pressure resistance acts in the −X direction. This pressure resistance generates a damping effect, thereby suppressing minute vibration of contact pressure spring 12. The pressure resistance gradually decreases operation speed of movable-side electrode 6, and finally, an electrode opening operation ends at a point at which an operating force of operating unit 10 and a force by the pressure resistance balance. Even if first partition wall 13*a* is not provided, a gas between sliding member 11 and one side end surface inside the grounded tank is compressed to produce a damping effect, and first partition wall 13*a* is thus not essential. However, by disposing first partition wall 13*a* in insulating tube 3, a greater damping effect is produced.

As shown in FIG. 1(*h*), when movable-side electrode 6 is closed by operating unit 10, the movable rod moves in the −X direction together with contact pressure spring 12. When the movable rod does so, sliding member 11 also moves simultaneously. After movable-side electrode 6 comes into contact with fixed-side electrode 5, movable-side insulating rod 8 that is a component of the movable rod is further pressed against the left end of contact pressure spring 12 and thus compresses contact pressure spring 12. When contact pressure spring 12 is compressed, a restoring force of contact pressure spring 12 acts in the −X direction. This can reduce contact resistance between fixed-side electrode 5 and movable-side electrode 6 and ensures that movable-side electrode 6 is closed with respect to fixed-side electrode 5.

Figure 2:
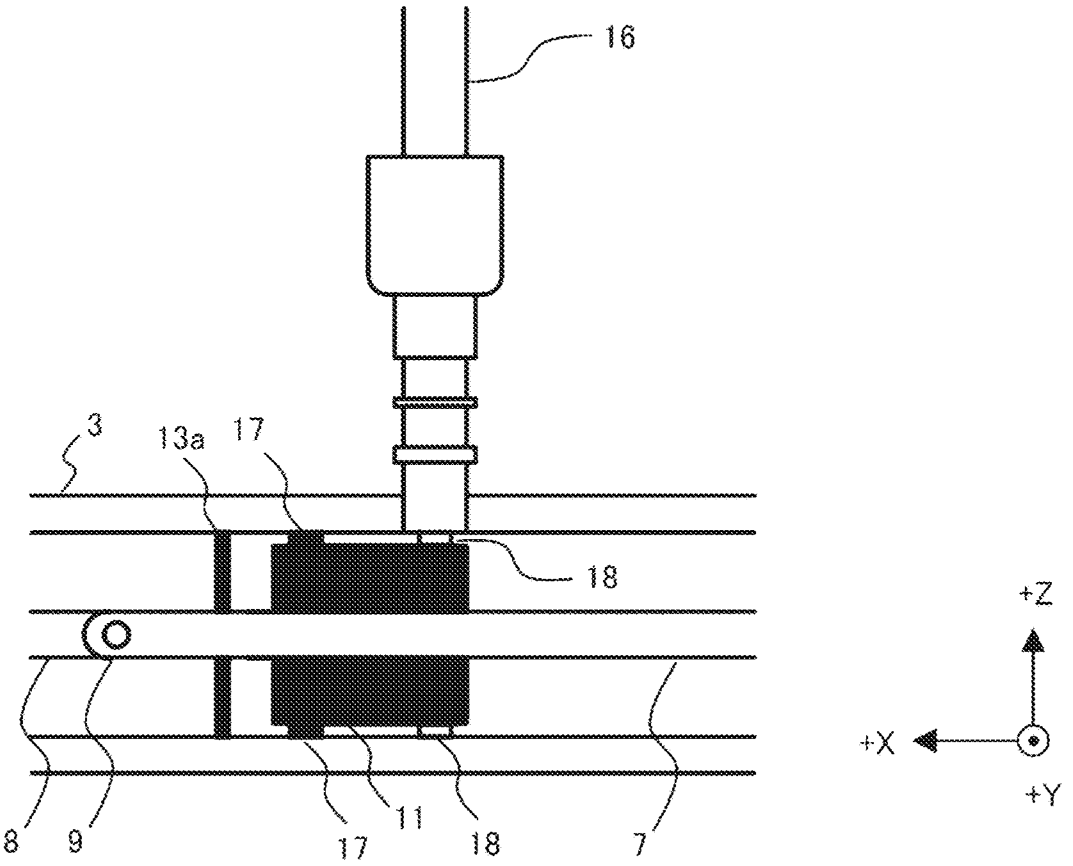
FIG. 2 is an example of a cross section around a sliding member according to the first embodiment.

FIG. 2 is an example of a cross section around sliding member 11 according to the first embodiment. Any component shown in FIG. 2 that is identical to a component shown in FIG. 1 is identically denoted. Such a component will not be described in detail.

An sliding seal member 17 is disposed between a side surface of insulating tube 3 and sliding member 11. Sliding seal member 17 is made of rubber such as a T-ring or an O-ring. This ensures hermeticity between sliding member 11 and first partition wall 13*a*, and provides a larger damping effect when movable-side electrode 6 is opened. However, sliding seal member 17 is not necessarily required, insofar as some hermeticity can be ensured by sliding member 11 alone.

Conductive member 18 ensures a path through which a current flows between the casting (not shown) and sliding member 11.

According to the first embodiment described above, when opening an electrode, sliding member 11 slides in insulating tube 3, which generates pressure resistance, and minute vibration of contact pressure spring 12 can be suppressed without vacuum circuit breaker 100 being generally increased in size.

Second Embodiment

When movable-side electrode 6 is opened, excessively large pressure resistance results in a reduced electrode opening speed. Accordingly, in the present embodiment, a through hole is formed through at least one of sliding member 11, first partition wall 13*a*, and insulating tube 3 to adjust pressure resistance.

Figure 3:
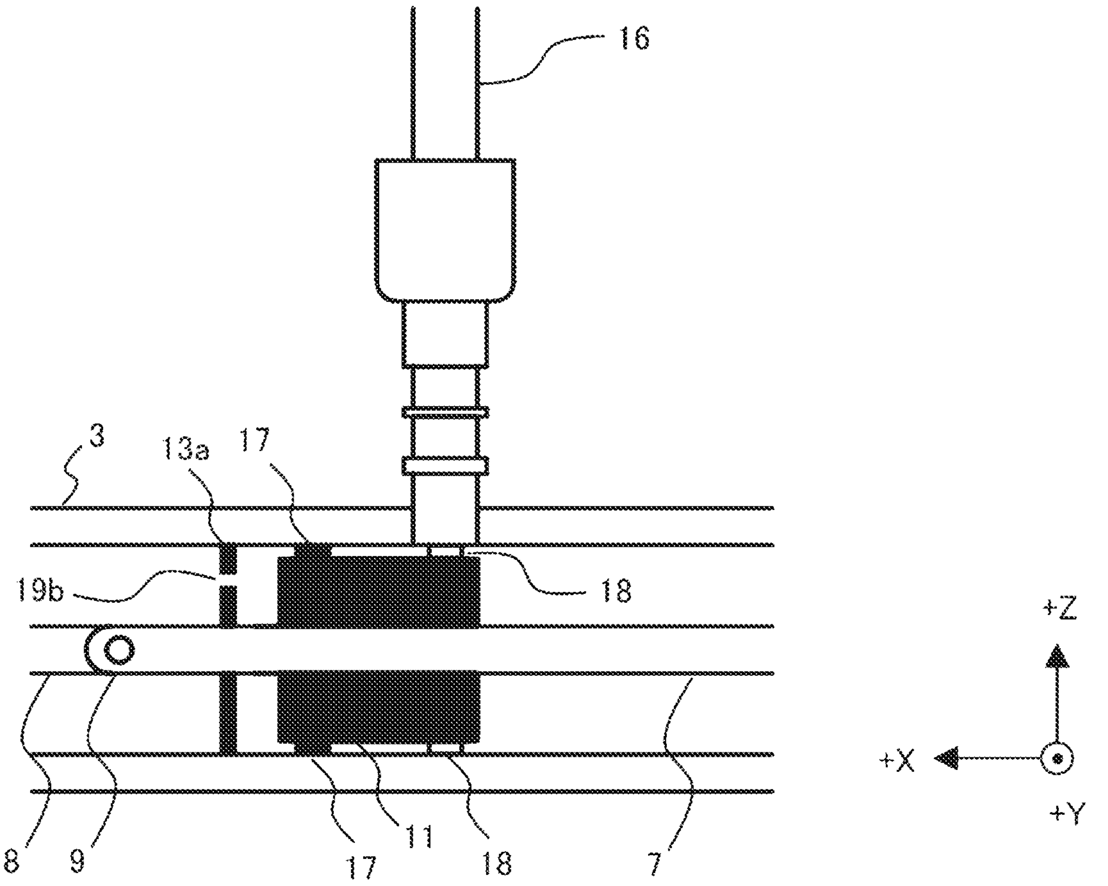
FIG. 3 is an example of a cross section around a sliding member when a first through hole is formed through the sliding member in a second embodiment.

FIG. 3 is an example of a cross section around sliding member 11 when a first through hole 19*a* is formed through sliding member 11 in the second embodiment. Any component shown in FIG. 3 that is identical to a component shown in FIG. 2 is identically denoted, Such a component will not be described in detail.

As shown in FIG. 3, first through hole 19*a* is formed through sliding member 11 in the longitudinal direction of insulating tube 3, that is, in the X-axis direction. This allows reduced pressure resistance and an increased electrode opening speed. This can reduce a load of operating unit 10 for operating the movable rod. However, first through hole 19*a* may reduce the damping effect. Accordingly, in order to maintain pressure resistance as much as possible when opening the electrode, it is desirable that first through hole 19*a* have a small size so that the gas in insulating tube 3 hardly leaks in the −X direction more negative than sliding member 11. This contemplates coestablishing an electrode opening speed and a damping effect. Further, first through hole 19*a* may not necessarily be parallel to the X-axis direction, insofar as first through hole 19*a* can penetrate sliding member 11. Further, two or more first through holes 19*a* may be formed through sliding member 11 in the X-axis direction.

Figure 4:
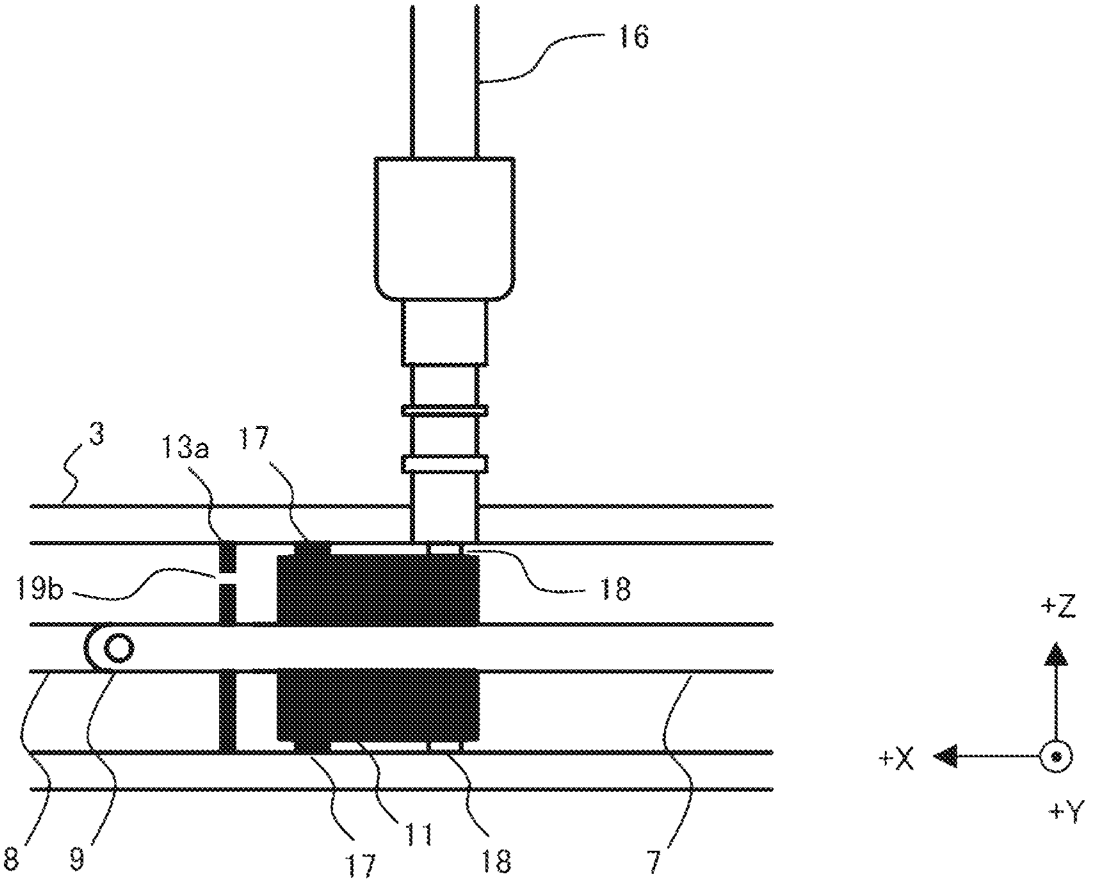
FIG. 4 is an example of a cross section around a sliding member when a second through hole is formed through a first partition wall in the second embodiment.

FIG. 4 is an example of a cross section around sliding member 11 when a second through hole 19*b* is formed through first partition wall 13*a* in the second embodiment. Any component shown in FIG. 4 that is identical to a component shown in FIG. 2 is identically denoted. Such a component will not be described in detail.

As shown in FIG. 4, second through hole 19*b* is formed through first partition wall 13*a* in the longitudinal direction of insulating tube 3, that is, in the X-axis direction. This allows reduced pressure resistance and an increased electrode opening speed. This can reduce a load of operating unit 10 for operating the movable rod. On the other hand, in order to maintain pressure resistance as much as possible when opening the electrode, it is desirable that second through hole 19*b* have a small size so that the gas in insulating tube 3 hardly leaks in the X direction more positive than first partition wall. 13*a*. Second through hole 19*b* may not necessarily be parallel to the X-axis direction, insofar as second through hole 19*b* can penetrate first partition wall 13*a*. Further, two or more second through holes 19*b* may be formed through first partition wall 13*a* in the X-axis direction.

Figure 5:
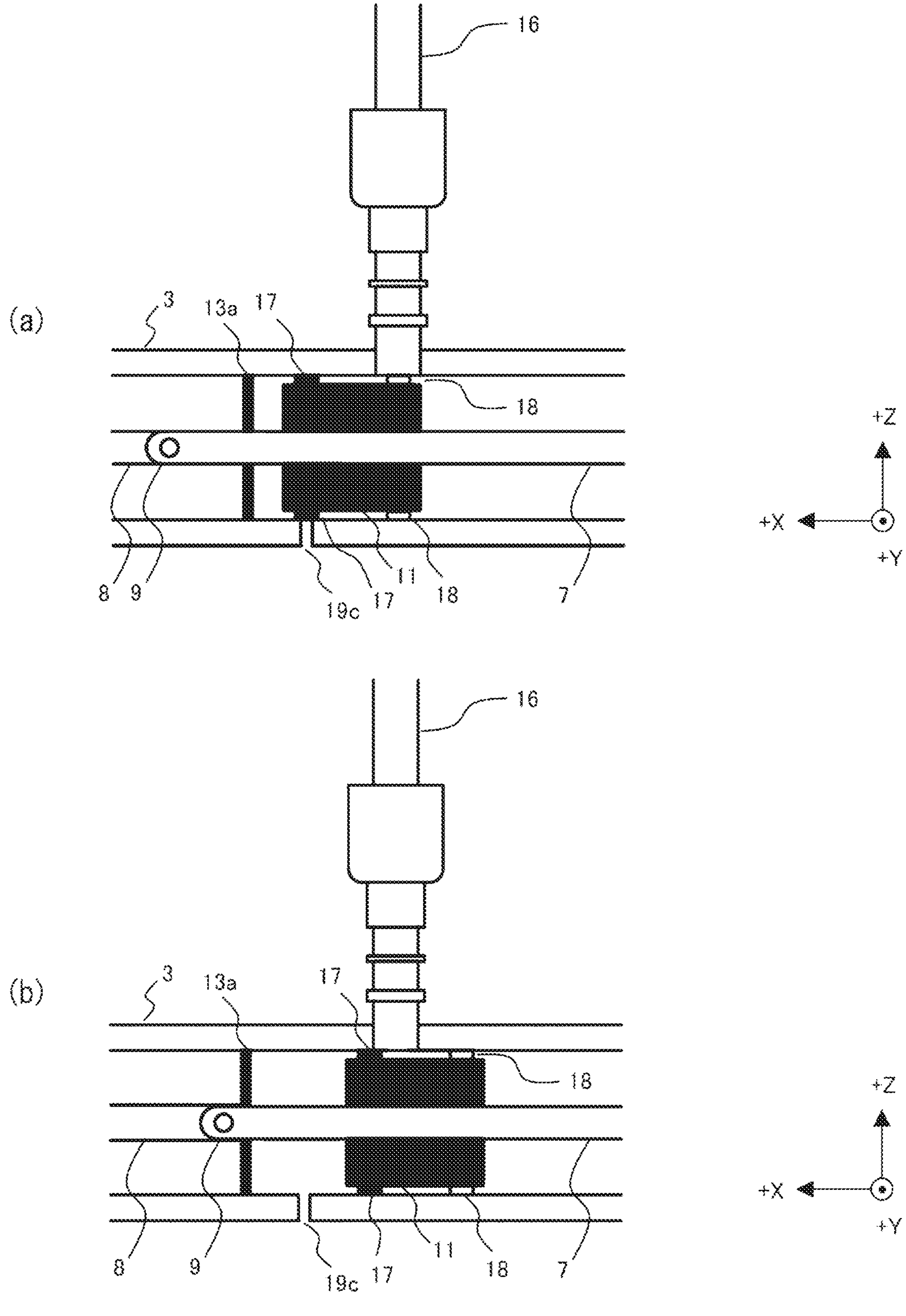
FIG. 5 is an example of a cross section around the sliding member when a third through hole is formed through a side surface of an insulating tube in the second embodiment.

FIG. 5 is an example of a cross section around sliding member 11 when a third through hole 19*c* is formed through a side surface of insulating tube 3 in the second embodiment. FIG. 5(*a*) is a cross section around sliding member 11 when movable-side electrode 6 is opened. FIG. 5(*b*) is a cross section around sliding member 11 when movable-side electrode 6 is closed. Any component shown in FIG. 5 that is identical to a component shown in FIG. 2 is identically denoted. Such a component will not be described in detail.

As shown in FIG. 5, third through hole 19*c* is formed through a side surface of insulating tube 3 between first partition wall 13*a* and sliding member 11 after the electrode is closed. When there is no first partition wall 13*a*, third through hole 19*c* is formed through a side surface of insulating tube 3 between one side end surface inside grounded tank 1 and sliding member 11 after the electrode is closed. Third through hole 19*c* is formed so as to be closed by sliding member 11 after the electrode is opened. Thus, when movable-side electrode 6 starts to open, third through hole 19*c* allows the electrode to be rapidly opened. Immediately before opening movable-side electrode 6 ends, third through hole 19*c* is closed by sliding member 11, so that pressure resistance rapidly increases, and minute vibration of contact pressure spring 12 can thus be suppressed. On the other hand, in order to maintain pressure resistance as much as possible when opening the electrode, it is desirable that third through hole 19*c* have a small size so that the gas in insulating tube 3 hardly leaks outside. Further, two or more third through holes 19*c* may be formed through a side surface of insulating tube 3.

Figure 6:
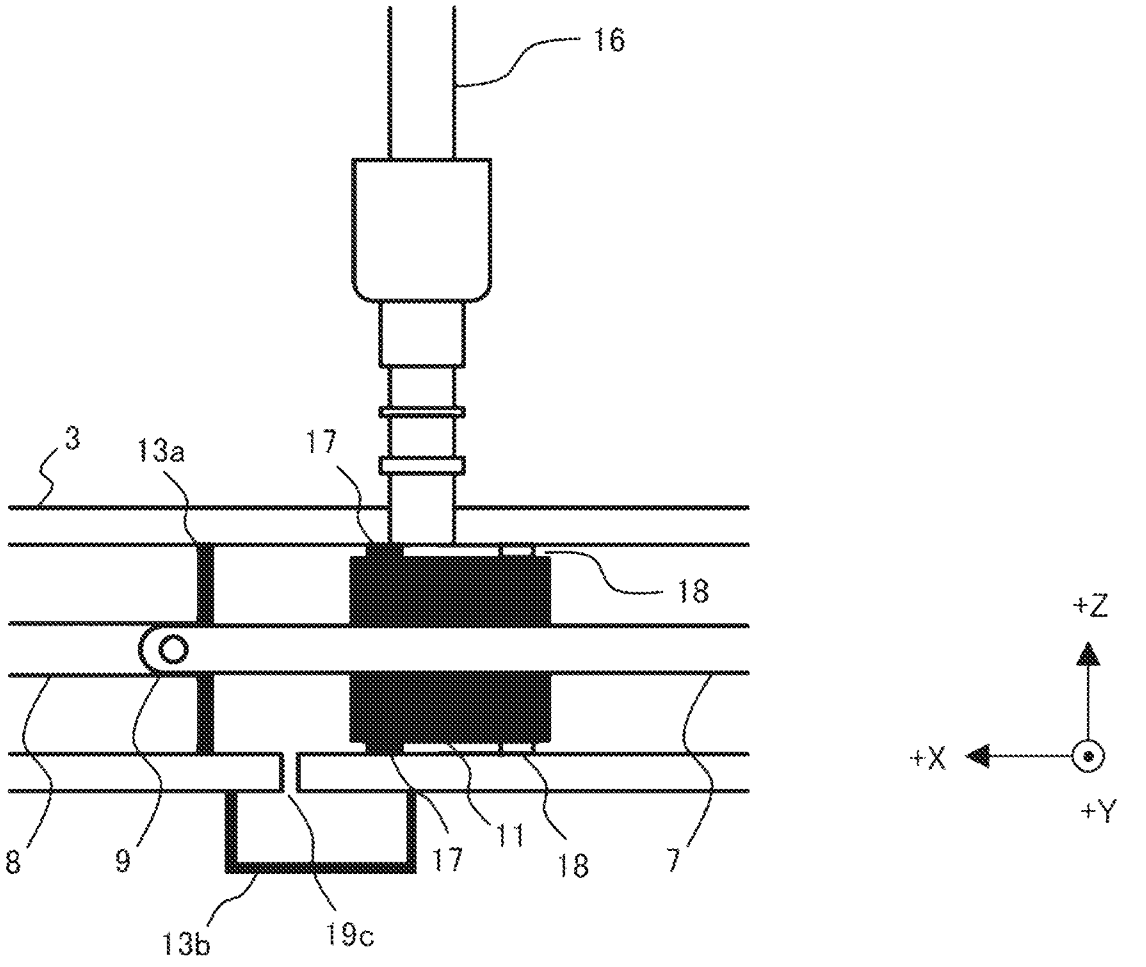
FIG. 6 is an example of a cross section around the sliding member when a second partition wall is provided in the second embodiment.

FIG. 6 is an example of a cross section around sliding member 11 when a second partition wall 13*b* is grounded in the second embodiment. Any component shown in FIG. 6 that is identical to a component shown in FIG. 5 is identically denoted. Such a component will not be described in detail.

As shown in FIG. 6, second partition wall 13*b* is disposed outside insulating tube 3 so as to cover third through hole 19*c*. While in FIG. 5, a large amount of gas may leak through third through hole 19*c*, this can be prevented by providing second partition wall 13*b*, Further, changing second partition wall 13*b* in size can adjust pressure resistance.

Figure 7:
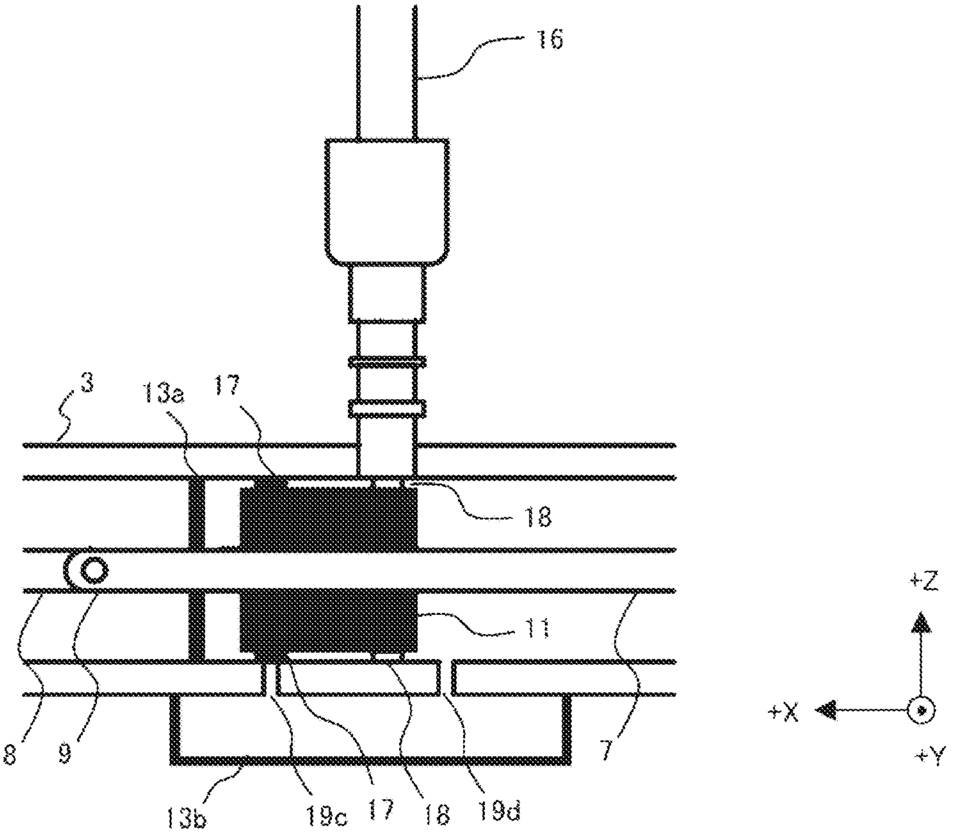
FIG. 7 is an example of a cross section around the sliding member when a fourth through hole is formed through a side surface of the insulating tube in the second embodiment.
Figure 7:
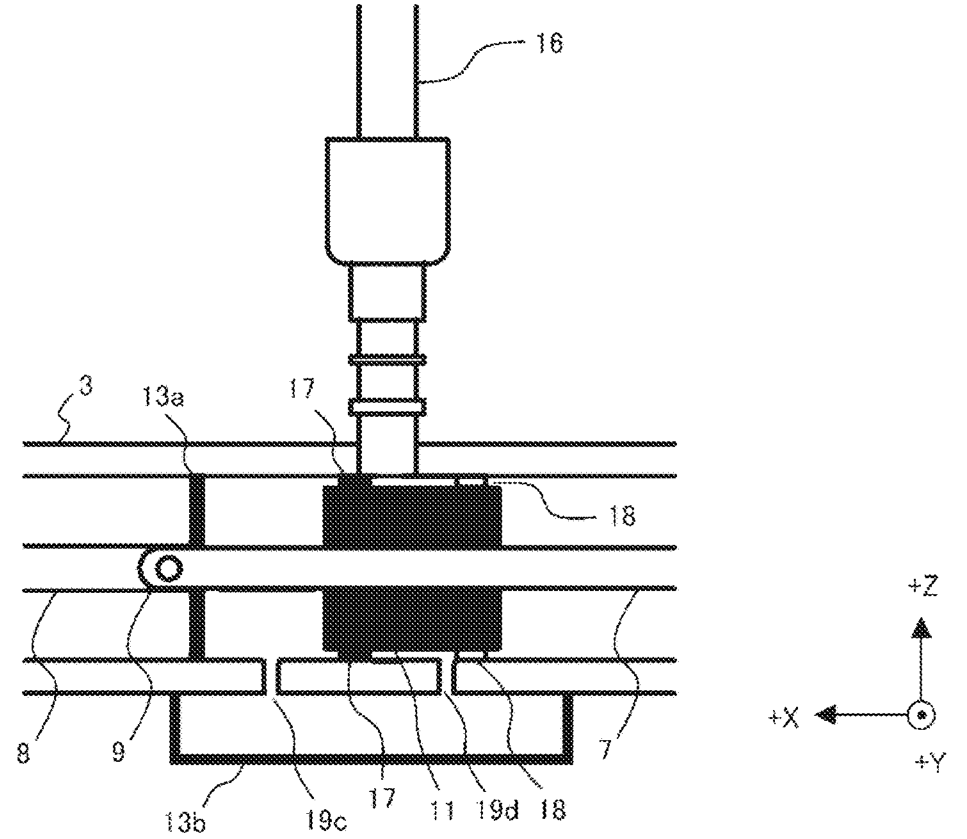

FIG. 7 is an example of a cross section around sliding member 11 when a fourth through hole 19*d* is formed through a side surface of insulating tube 3 in the second embodiment, FIG. 7(*a*) is a cross section around sliding member 11 when movable-side electrode 6 is opened. FIG. 7(*h*) is a cross section around sliding member 11 when movable-side electrode 6 is closed. Any component shown in FIG. 7 that is identical to a component shown in FIG. 6 is identically denoted. Such a component will not be described in detail.

As shown in FIG. 7, fourth through hole 19*d* is formed through a side surface of insulating tube 3 between one side end surface outside vacuum chamber 2 and sliding member 11 after the electrode is opened, and second partition wall 13*b* is disposed so as to cover third through hole 19*c* and fourth through hole 19*d*. This allows a gas between sliding member 11 and first partition wall 13*a* to escape in the –X direction more negative than sliding member 11, and can effectively adjust pressure resistance when opening the electrode, Although a similar effect can be obtained by increasing second partition wall 13*b* in size in FIG. 6, this cannot be done in view of space in some cases. Providing fourth through hole 19*d* allows pressure resistance to be adjusted without increasing second partition wall 13*b* in size in the Z-axis direction.

According to the second embodiment described above, by forming a through hole through sliding member 11, first partition wall 13*a* or insulating tube 3, pressure resistance when opening an electrode can be adjusted, and coestablishment of an electrode opening speed and a damping effect can be contemplated.

Third Embodiment

Figure 8:
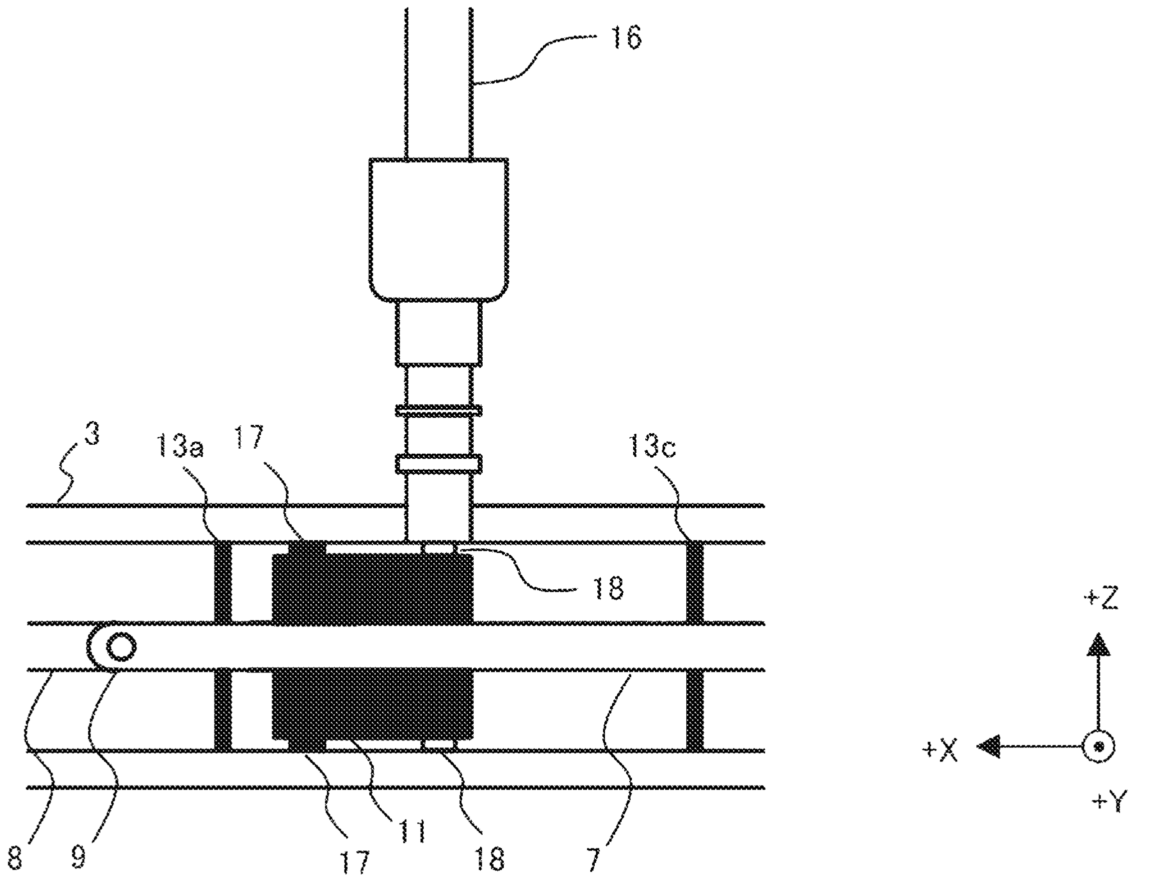
FIG. 8 is an example of a cross section around a sliding member when a third partition wall is provided in a third embodiment.

FIG. 8 is an example of a cross section around sliding member 11 when a third partition wall 13*c* is provided in a third embodiment. Any component shown in FIG. 8 that is identical to a component shown in FIG. 2 is identically denoted, Such a component will not be described in detail.

As shown in FIG. 8, third partition wall 13*c* is disposed between one side end surface outside vacuum chamber 2 and sliding member 11. This can ensure hermeticity between first partition wall 13*a* and third partition wall 13*c*. When pressure resistance when opening the electrode is excessively increased by ensuring hermeticity, pressure resistance can be adjusted by forming the through bole described in the second embodiment. Third partition wall 13*c* also suppresses minute vibration of contact pressure spring 12 caused when closing the electrode, and thus effectively suppresses wear of fixed-side electrode 5 and movable-side electrode 6.

According to the third embodiment described above, third partition wall 13*c* ensures hermeticity between first partition wall 13*a* and third partition wall 13*c* and can suppress minute vibration of contact pressure spring 12 when opening the electrode.

The first to third embodiments are applicable not only to a vacuum circuit breaker but also to a gas circuit breaker. In this case, the electrodes are not inserted in a vacuum and instead inserted in an insulating gas such as sulfur hexafluoride.

REFERENCE SIGNS LIST

1 grounded tank, 2 vacuum chamber, 3 insulating tube, 4 fixed rod, 5 fixed-side electrode, 6 movable-side electrode, 7 movable-side conducting rod, 8 movable-side insulating rod, 9 coupling unit, 10 operating unit, 11 sliding member, 12 contact pressure spring, 13*a* first partition wall, 13*b* second partition wall, 13*c* third partition wall, 14 bellows, 15 fixed-side conductor, 16 movable-side conductor, 17 sliding seal member, 18 conductive member, 19*a* first through hole, 19*b* second through hole, 19*c* third through hole, 19*d* fourth through hole, 100 vacuum circuit breaker.

The invention claimed is:

1. A vacuum circuit breaker comprising:

a grounded tank;

a vacuum chamber disposed in the grounded tank;

an insulating tube disposed between one side end surface inside the grounded tank and one side end surface outside the vacuum chamber;

a fixed rod inserted into the vacuum chamber;

a fixed-side electrode disposed in the vacuum chamber at one end of the fixed rod;

a movable-side electrode disposed in the vacuum chamber so as to face the fixed-side electrode;

a movable rod partially disposed in the insulating tube and having one end with the movable-side electrode disposed thereon;

a slider disposed on the movable rod so as to slide in the insulating tube;

a first partition wall in the insulating tube between one side end surface of the grounded tank and the slider;

a contact pressure spring disposed at the movable rod between the one side end surface of the grounded tank and the slider.

2. The vacuum circuit breaker according to claim 1, further comprising a sliding seal between a side surface in the insulating tube and the slider.

3. The vacuum circuit breaker according to claim 2, wherein the sliding seal is rubber.

4. The vacuum circuit breaker according to claim 1, wherein the contact pressure spring is disposed at the movable rod between the slider and the first partition wall.

5. The vacuum circuit breaker according to claim 1, wherein a first through hole is formed through the slider longitudinally of the insulating tube.

6. The vacuum circuit breaker according to claim 1, wherein a second through hole is formed through the first partition wall longitudinally of the insulating tube.

7. The vacuum circuit breaker according to claim 1, wherein a third through hole is formed through a side surface of the insulating tube between the first partition wall and the slider after the electrode is closed.

8. The vacuum circuit breaker according to claim 7, wherein the third through hole is formed so as to be closed by the slider after the electrode is opened.

9. The vacuum circuit breaker according to claim 7, further comprising a second partition wall disposed outside the insulating tube so as to cover the third through hole.

10. The vacuum circuit breaker according to claim 9, wherein a fourth through hole is formed through a side surface of the insulating tube between one side end surface outside the vacuum chamber and the slider after the electrode is opened, and the second partition wall is disposed so as to cover the third through hole and the fourth through hole.

11. The vacuum circuit breaker according to claim 1, further comprising a third partition wall provided in the insulating tube between one side end surface outside the vacuum chamber and the slider.

12. The vacuum circuit breaker according to claim 1, wherein the contact pressure spring is disposed at the movable rod between the one side end surface of the grounded tank and the first partition wall.

* * * * *